United States Patent [19]

Nylund

[11] 4,416,852
[45] Nov. 22, 1983

[54] MULTI-ELEVATED NUCLEAR REACTOR SPACER GRID

[75] Inventor: Olov Nylund, Västeras, Sweden

[73] Assignee: AB Asea-Atom, Västeras, Sweden

[21] Appl. No.: 239,947

[22] Filed: Mar. 3, 1981

[30] Foreign Application Priority Data

Mar. 17, 1980 [SE] Sweden ............................... 8002079

[51] Int. Cl.³ .............................................. G21C 3/34
[52] U.S. Cl. .................................... 376/438; 376/439; 376/446
[58] Field of Search ............... 376/434, 448, 364, 453, 376/362, 426, 409, 363, 438, 440, 442, 462, 439, 446

[56] References Cited

U.S. PATENT DOCUMENTS

| | | | |
|---|---|---|---|
| 3,389,056 | 6/1968 | Frisch | 376/442 X |
| 3,475,273 | 10/1969 | Krawiec | 376/440 |
| 3,607,639 | 9/1971 | Van Santen et al. | 376/438 |
| 3,697,375 | 10/1972 | Suvanto et al. | 376/440 |
| 3,806,410 | 4/1974 | Ripley | 376/442 |
| 3,886,038 | 5/1975 | Raven | 376/442 |
| 4,056,441 | 11/1977 | Marmonier et al. | 376/438 |
| 4,325,786 | 4/1982 | Wohlsen | 376/462 |

Primary Examiner—Richard E. Schafer
Assistant Examiner—Daniel Wasil
Attorney, Agent, or Firm—Pollock, Vande Sande & Priddy

[57] ABSTRACT

A fuel assembly for a boiling reactor is constructed according to the accompanying drawing (FIG. 1). Preferably, only partial spacers (6) are used in the fuel assembly. Each partial spacer positions only a minor portion of the total number of fuel rods in the assembly. Groups of partial spacers are arranged axially one after the other, the partial spacers in each group being positioned at at least two different levels and together positioning all fuel rods in the fuel assembly.

6 Claims, 18 Drawing Figures

FIG. 1
FIG. 2
FIG. 3
FIG. 4
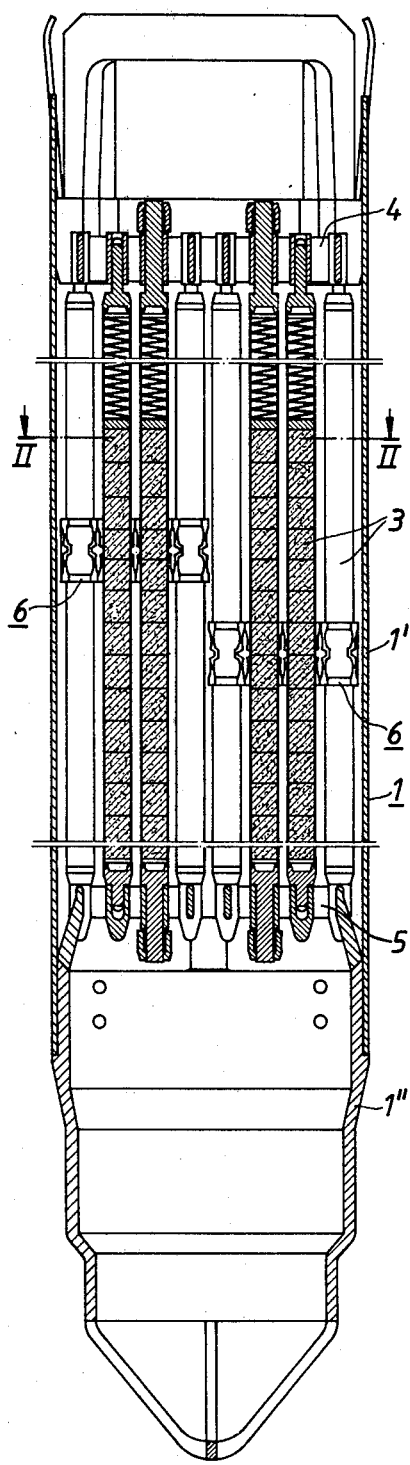
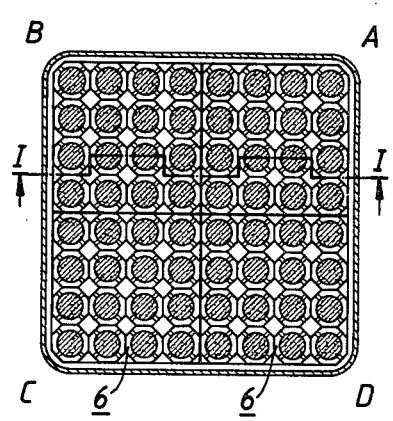
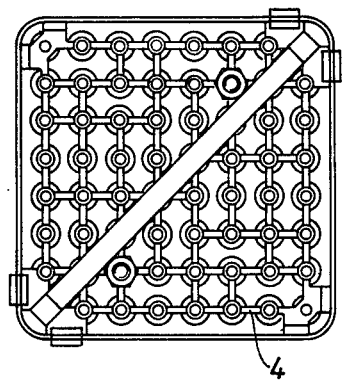
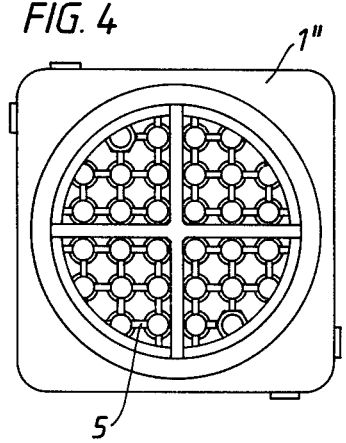

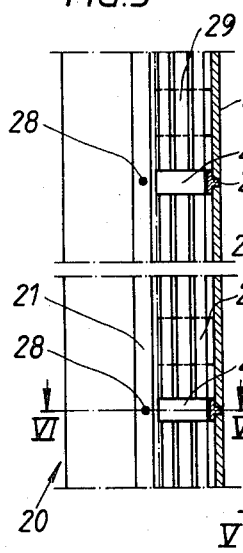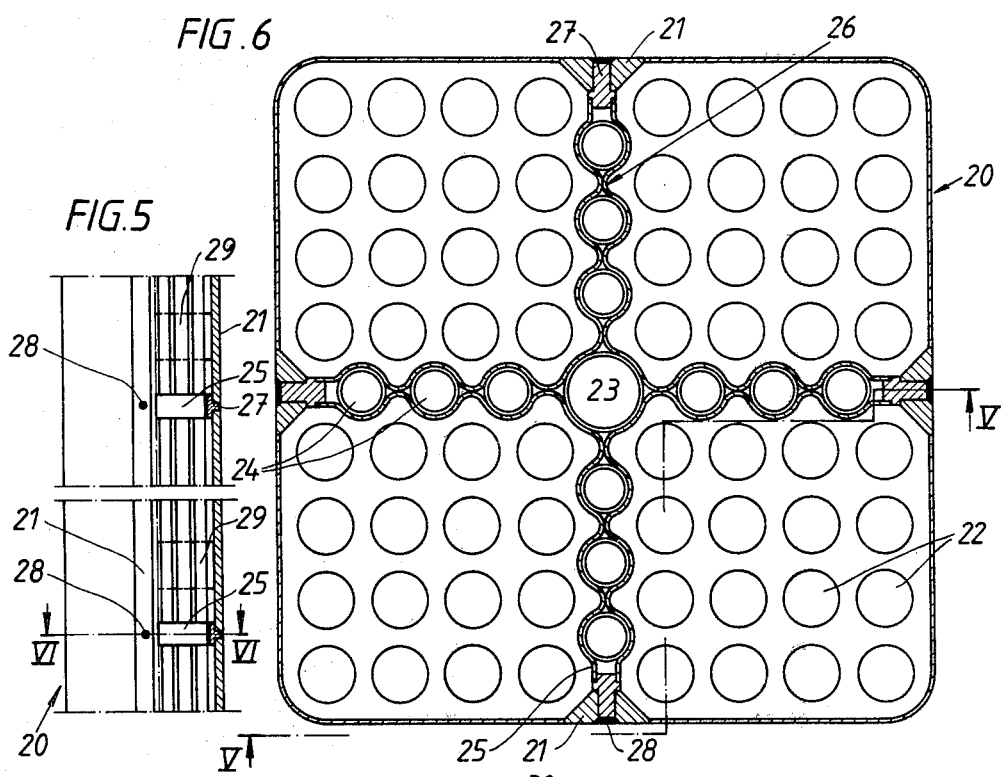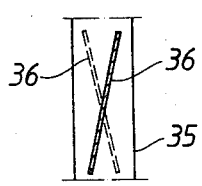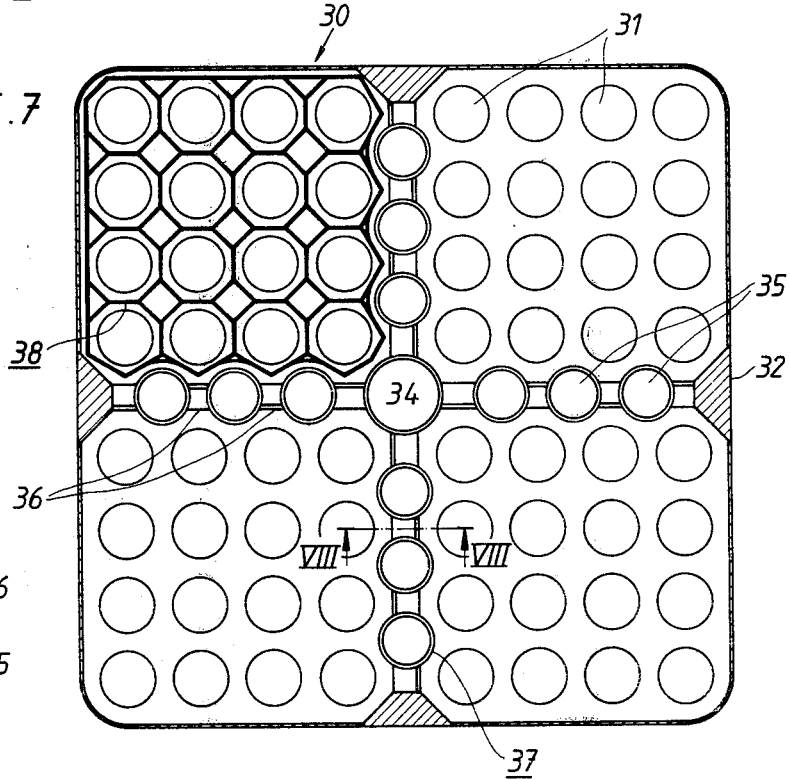

FIG. 9
FIG. 11
FIG. 13
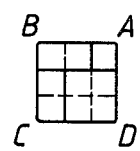
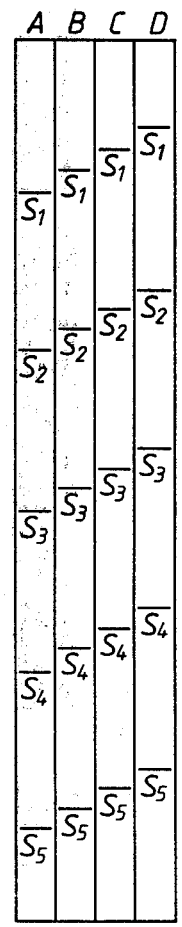
FIG. 10
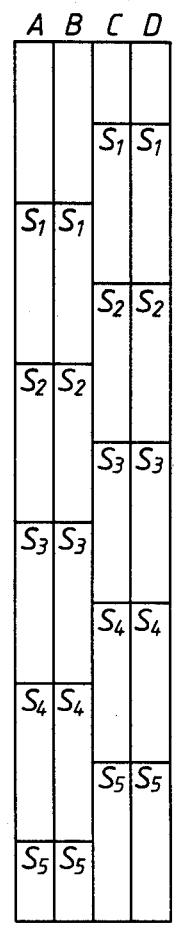
FIG. 12
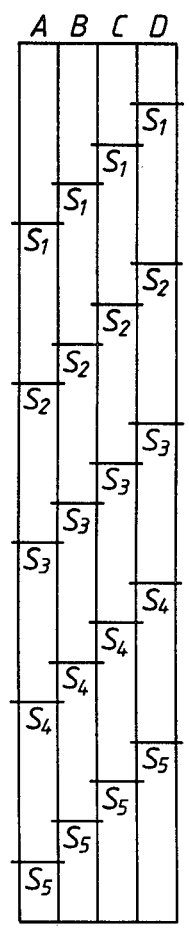
FIG. 14

FIG. 15
| B | A |
|---|---|
| C | D |
FIG. 17
| B | A |
|---|---|
| C | D |
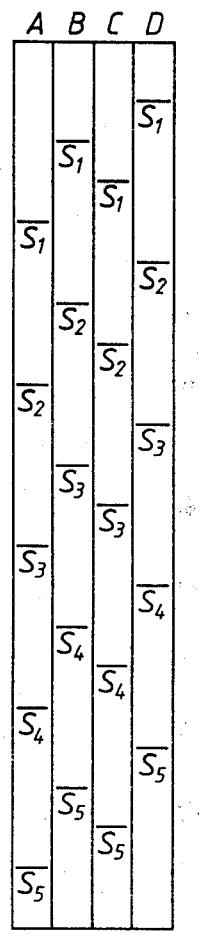
FIG. 16
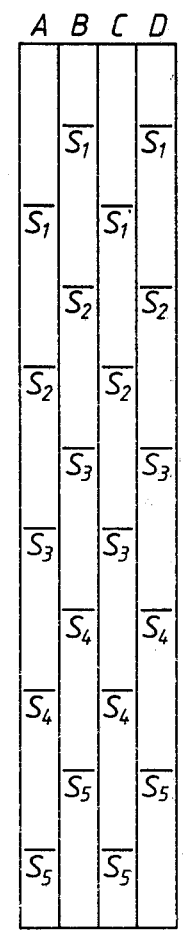
FIG. 18

MULTI-ELEVATED NUCLEAR REACTOR SPACER GRID

TECHNICAL FIELD

The present invention relates to a fuel assembly intended for a boiling reactor and comprising a fuel box, a plurality of spacers and a plurality of vertical fuel rods positioned in the fuel box by means of said spacers.

BACKGROUND ART

A fuel assembly of this type is known, for example, from U.S. Pat. No. 3,697,375.

DISCLOSURE OF THE INVENTION

A purpose of the invention is to provide improved cooling during normal operation. In a fuel assembly of the above-mentioned type the spacers are arranged in such a way that the coolant, to a greater extent than in a conventional spacer arrangement, is redistributed between differently loaded portions of the fuel assembly. Another purpose is to provide an increased margin against local dryout through an axially more uniformly distributed turbulence formation. Further, the intention is to reduce the risk of CCFL (Counter Current Flow Limiting) during emergency cooling, that is, to counteract the tendency of the steam, flowing through the spacers, to prevent the penetration of the emergency cooling water into the core. Furthermore, the intention is to obtain, during normal operation, a reduced drop pressure for the cooling water pumped through the core. What characterises the invention is clear from the appended claims.

BRIEF DESCRIPTION OF THE DRAWINGS

In the following the invention will be described with reference to the accompanying schematic drawings.

FIGS. 1, 2, 3 and 4 show a first embodiment of a fuel assembly according to the invention:

FIG. 1 showing a vertical section along I—I of FIG. 2;

FIG. 2 showing a horizontal section along II—II of FIG. 1;

FIG. 3 showing the fuel assembly seen from above; and

FIG. 4 showing the fuel assembly seen from below.

FIGS. 5 and 6 show a second embodiment:

FIG. 5 showing a fuel assembly according to the invention in a partial side view and in a partial vertical section along V—V of FIG. 6; and FIG. 6 showing the same fuel assembly in a horizontal section along VI—VI of FIG. 5.

FIG. 7 shows in a horizontal section through the fuel assembly according to a third embodiment of the invention. FIG. 8 shows a vertical section along VIII—VIII of FIG. 7.

FIGS. 9–18 show very schematically five different examples of how groups of partially positioning spacers, arranged vertically one after the other, may be composed in a fuel assembly according to the invention, whereby vertical sections through the different quadrants, A, B, C, D, of the fuel assemblies, are arranged adjacent each other on FIGS. 10, 12, 14, 16, 18 to increase the clearness. The real positions of the quadrants with respect to each other are clear from the corresponding horizontal sections indicated with FIGS. 9, 11, 13, 15, 17. Each spacer is designated S with a subscript, each of the groups of partially positioning spacers having a subscript characteristic of the group.

BEST MODE FOR CARRYING OUT THE INVENTION

In FIGS. 1–4, 1 designates a fuel box intended to be arranged vertically in the core of a boiling reactor. Fuel box 1 is composed of a fuel channel 1' and a bottom portion 1" and contains sixty-four fuel rods 3, which are positioned by means of a top grid 4, a bottom grid 5 and a plurality of partial spacers 6. The spacers 6 are arranged to constitute a plurality of spacer groups arranged axially one after the other, the spacers in each group together positioning all the sixty-four fuel rods in the fuel assembly. Each spacer group comprises four spacers 6, which are arranged at four different levels with one spacer in each quadrant of the fuel assembly, each spacer only positioning sixteen fuel rods. In FIG. 2 the different quadrants are each marked with the letters A, B, C, D, respectively. The uppermost of the spacers shown in FIG. 1 lies in quadrant B, the second uppermost lies in quadrant A. The subsequent spacers (not shown in FIG. 1) lie in quadrants D and C, the lowermost being positioned in quadrant C.

If one, for example, regards a vertically upwardly streaming water flow which is located in one-fourth of the total number of fuel rods in the assembly and in the same quadrant as the lowermost of the spacers in any group, this flow will be somewhat deflected away from the spacer because of the hydraulic resistance of the spacer and instead flow along fuel rods in adjacent quadrants which are not provided with spacers at this level. This may result in certain, particularly hot fuel rods being supplied with cooling water which on its way upwards has flowed along fuel rods of a relatively low temperature. It is also realized that an arrangement of partial spacers, which provides a possibility for part of the water supplied to each partial spacer to choose a path with less hydraulic resistance, results in a reduced total through-flow resistance than with a conventional arrangement with the same number of spacer cells.

Instead of the spacer arrangement described, each of the arrangments shown in FIGS. 10, 12, 16, 18 may be used. A fuel assembly according to the invention permits the fuel rods of the fuel assembly to be divided into partial bundles, which may be treated individually when removing and inserting fuel, each spacer being formed to position the fuel rods in one such partial bundle only and, as illustrated, being separate from and unconnected to the spacers in other quadrants. The use of partial bundles permits the positioning of stiffening means with vertical moderator channels in gaps between the partial bundles. FIGS. 5–7 show different embodiments of fuel assemblies furnished with stiffening means of this kind.

In the embodiment of a fuel assembly according to the invention shown in FIGS. 5 and 6, each of the walls of the fuel box 20 is formed with one single, relatively long, vertical stiffening strip 21. As an alternative, each wall may instead be formed with an inwardly-folded sheet-metal portion, or with a plurality of vertical stiffening strips arranged one after the other. The fuel rods of the fuel assembly are designated 22. The fuel assembly has a central, relatively thick water tube 23 which together with twelve thinner water tubes 24 are arranged in a cruciform configuration. In separate level areas the water tubes 23 and 24 are connected to each other by means of four wavy, substantially L-shaped bands 25 of Zircaloy ®, which are welded to each other and preferably also to the water tubes 23 and 24, thus forming a support member 26 which in separate level areas has a cruciform cross-section. In each of the spiders formed by the bands 25 the arms are arranged in rigid mechanical connection with corresponding stiffening strips 21 with the aid of a block 27 welded to the end of the arm, which block 27 is inserted in a corresponding hole in the stiffening strip 21 and attached thereto by a welded joint 28. Within each quadrant of the fuel box 20, the fuel rods 22 are positioned with the aid of a plurality of spacers 29, arranged at different levels, each spacer then only surrounding fuel rods arranged in the corresponding quadrant. The spacers 29 are arranged in groups arranged axially one after the other, for example as indicated in FIGS. 9 and 10.

In the embodiment shown in FIGS. 7 and 8, the fuels rods 31 of the fuel assembly are surrounded by a fuel box 30 in which each wall is provided with a stiffening back in the form of a welded stiffening strip 32. As an alternative, the strip 32 may be replaced with an inwardly-folded wall portion. In the same way as shown in FIG. 6, a relatively large water tube 34 is arranged together with twelve smaller water tubes 35 in a cruciform configuration. In each of a plurality of separate level areas, mechanical connecting elements 36 are arranged between mutually adjacent water tubes, so that these together with the connecting elements 36 form a stiffening device 37 which has cruciform cross-section in a plurality of different level areas. The mutual distance between such level areas is at least as great as the vertical dimension of the connecting elements 36, which means that good hydraulic connections are obtained between adjacent quadrants of the fuel box, which is a condition for a spacer arrangement according to the invention to be able to fulfil the purpose stated in the introduction. Each connecting element 36 is arranged to form an acute angle with a vertical plane through the support arms in which it is included, which results in reactor coolant upon passage of a connecting element acquiring a horizontal speed component. As will be clear from FIG. 8, the angular adjustment of the fuel assembly shown is made in different directions in the connecting elements included in one and the same support arm. Suitably, the elements arranged immediately one after the other in one and the same arm may be arranged with a differing deflecting direction from element to element, as indicated in FIG. 8. The horizontal speed components mean that a flow of cooling water, which in a lower portion of the fuel assembly is located around a certain fuel rod, may further up be distributed among a plurality of fuel rods, thus obtaining a special temperature-equalizing effect in addition to that obtained by arranging the spacers in any of the ways shown in FIGS. 10, 12, 16 and 18.

Instead of welding the connecting elements 36 directly to the water tubes, the water tubes may advantageously be provided with sleeves and the connecting elements be welded to said sleeves.

The quadrants of the fuel box each includes a bundle of sixteen fuel rods. These are positioned by a plurality of spacers 38 arranged one after the other. Each such group of fuel rods may then be inserted and removed individually since, as illustrated, the spacers in each quadrant are separate from those in other quadrants.

The fuel assemblies shown in FIGS. 6 and 7 may be provided with a casing tube, bottom portion, a top grid and a bottom grid of substantially the same design as the fuel assembly shown in FIG. 1. Similar to this assembly, each of said fuel assemblies are intended to be surrounded, together with three similar fuel assemblies, by a square of a core grid by means of which the fuel assemblies are positioned in a reactor core in such a way that gaps for control rods are formed between them.

As indicated in FIGS. 13 and 14, a fuel assembly with substantially square cross-section may be provided with a plurality of groups of four partial spacers, arranged axially one after the other, which are each arranged at a corner, each partial spacer surrounding a number of fuel rods which is greater than one-fourth but less than one-half of the total number of fuel rods of the fuel assembly.

I claim:

1. A boiling water reactor fuel assembly comprising a plurality of vertical fuel rods, a fuel box having a rectangular cross-section, upper support means and lower support means for supporting said fuel rods within said box, a plurality of groups of spacer devices arranged between said upper and said lower support means, each of said groups of spacer devices positioning in said fuel box all of said fuel rods, each of said groups being composed of four separate spacer devices, each spacer device comprising a plurality of spacer grid cells, all spacer grid cells of each spacer device being disposed at one and the same level, the total number of spacer grid cells in each of said spacer devices being less than one-half the number of said fuel rods, the four separate devices of each of said groups being disposed at least at two different levels within said fuel box with each spacer device being at a corresponding corner of said fuel box.

2. Fuel assembly according to claim 1, wherein said fuel box comprises at least one stiffening member having cruciform cross-section and four support arms which are each attached to a wall of said fuel box, each spacer device positioning the fuel rods of a fuel rod bundle which together with its spacer devices, unimpeded by said stiffening members, is removable from said fuel box.

3. Fuel assembly according to claim 1, wherein at least one of said spacer devices arranged at the corners of said fuel box surrounds a number of fuel rods which is greater than one-fourth of the total number of fuel rods in said fuel box.

4. Fuel assembly according to claim 1, wherein said spacer devices arranged in said corners are arranged at four different levels within each of said groups of spacer devices.

5. Fuel assembly according to claim 1, wherein said spacer devices arranged in said corners are arranged at two different levels within each of said groups of spacer devices.

6. Fuel assembly according to claim 1, wherein each of said spacer grid cells is dimensioned to receive only one of said of said fuel rods.

* * * * *